(12) United States Patent
Fujioka et al.

(10) Patent No.: US 6,299,560 B1
(45) Date of Patent: Oct. 9, 2001

(54) CONTROL DEVICE FOR VEHICLE AUTOMATIC TRANSMISSION

(75) Inventors: Masato Fujioka; Tooru Takahashi; Kenji Nakajima, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,278

(22) Filed: Mar. 2, 2000

(30) Foreign Application Priority Data

Mar. 3, 1999 (JP) .................................................. 11-055906

(51) Int. Cl.$^7$ .................................................. F16H 61/12
(52) U.S. Cl. .......................... 475/119; 475/120; 475/127; 477/906
(58) Field of Search .................................... 475/119, 120, 475/127; 477/906

(56) References Cited

U.S. PATENT DOCUMENTS

| 4,903,551 | | 2/1990 | Hiramatsu et al. |
|---|---|---|---|
| 5,505,868 | * | 4/1996 | Eaton .................................... 475/119 |
| 5,888,169 | * | 3/1999 | Jong ..................................... 477/906 |
| 6,102,826 | * | 8/2000 | Takahashi et al. .................... 475/119 |

FOREIGN PATENT DOCUMENTS

| 0 294 033 | 12/1988 | (EP) . |
|---|---|---|
| 0 694 713 | 1/1996 | (EP) . |
| 0 837 268 | 4/1998 | (EP) . |
| 8-42681 | 2/1996 | (JP) . |

OTHER PUBLICATIONS

Patent Abstracts of Japan, vol. 016, No. 253 (M–1263), Jun. 9, 1992 & JP 04 060271, Feb. 26, 1992.

* cited by examiner

Primary Examiner—Sherry Estremsky
(74) Attorney, Agent, or Firm—Arent Fox Kintner Plotkin & Kahn, PLLC

(57) ABSTRACT

A vehicle automatic transmission selectively establishes a plurality of shift ranges through a simultaneous engagement of the two hydraulic coupling elements C1, C2 of the first group and a simultaneous engagement of either one of the two hydraulic coupling elements of the first group and any one of the two or more hydraulic coupling elements C3, B1, B2 of the second group. A fail-safe valve 9 is interposed between an oil passage L3 communicating with the shift control valves $6_1$, $6_4$, $6_5$ other than the shift control valves $6_2$, $6_3$ corresponding to the hydraulic coupling elements C2, C3 that are being intended to establish a predetermined single shift range and an oil supply passage L2. A resultant signal valve is provided that is adapted to output a signal pressure when hydraulic pressures of the two hydraulic coupling elements C1, C2 of the first group are inputted into the resultant signal valve to be found that the hydraulic pressures of the two hydraulic coupling elements C1, C2 increase. The fail-safe valve 9 is constructed so as to be switched over to the closed position when hydraulic pressures of the respective hydraulic coupling elements C3, B1, B2 of the second group and the signal pressure are inputted into the fail-safe valve 9 to be found that any two or more of the hydraulic pressures and signal pressure increase at the same time.

6 Claims, 3 Drawing Sheets

FIG. 3

| | HYDRAULIC COUPLING ELEMENT | | | | | SOLENOID VALVE | | | | |
|---|---|---|---|---|---|---|---|---|---|---|
| | C1 | C2 | C3 | B1 | B2 | 7₁ | 7₂ | 7₃ | 7₄ | 7₅ |
| FIRST SPEED | ○ | × | × | × | ○ | ON | ON | ON | OFF | ON |
| SECOND SPEED | ○ | × | × | ○ | × | ON | ON | ON | ON | OFF |
| THIRD SPEED | ○ | × | ○ | × | × | ON | ON | OFF | OFF | OFF |
| FOURTH SPEED | ○ | ○ | × | × | × | ON | OFF | ON | OFF | OFF |
| FIFTH SPEED | × | ○ | ○ | × | × | OFF | OFF | OFF | OFF | OFF |
| SIXTH SPEED | × | ○ | × | ○ | × | OFF | OFF | ON | ON | OFF |

CONTROL DEVICE FOR VEHICLE AUTOMATIC TRANSMISSION

BACKGROUND OF THE INVENTION

1. Field of the Invention

The present invention relates to a control device for a vehicle automatic transmission comprising two hydraulic coupling elements belonging to a first group and two or more hydraulic coupling elements belonging to a second group and adapted to selectively establish a plurality of shift ranges through a simultaneous engagement of the two hydraulic coupling elements of the first group and a simultaneous engagement of either one of the two hydraulic coupling elements of the first group and any one of the two or more hydraulic coupling elements of the second group.

2. Description of the Related Art

Conventionally, as a control device of this kind, a control device is known in which a shift control valve is provided for each of the hydraulic coupling elements of the first and second groups so that supplying and draining of oil to and from the respective hydraulic coupling elements are individually controlled by the respective shift control valves. In this control device, however, when the shift control valves malfunction, there may be caused a problem that oil happens to also be supplied to the other hydraulic coupling elements than the hydraulic coupling elements that are being intended to establish a desired shift range, resulting in a double meshing in which a plurality of shift ranges are established at the same time.

Here, in the vehicle automatic transmission in which a plurality of shift ranges are selectively established through a simultaneous engagement of two hydraulic coupling elements of the first group and a simultaneous engagement of either one of the hydraulic coupling elements of the first group and any one of the hydraulic coupling elements of the second group, however, as long as the shift control valves do not malfunction, there happens no case in which oil is supplied to three hydraulic coupling elements simultaneously. Japanese Patent Unexamined Publication No. Hei. 8-42681 discloses a conventional control device in which a fail-safe valve is interposed between shift control valves other than those corresponding to hydraulic coupling elements that are being intended to establish a predetermined single shift range and an oil supply passage communicating with a hydraulic pressure source, the fail-safe valve being constructed so as to freely be switched over between an open position where the oil supply passage is connected to the other shift control valves and a closed position where such a connection is disconnected. The fail-safe valve so structured is switched over to the closed position when hydraulic pressures of the respective hydraulic coupling elements of first and second groups are inputted into the fail-safe valve to be found that any three of those hydraulic pressures increase. According to this construction, oil is prevented from being supplied to the hydraulic coupling elements corresponding to the other shift control valves, a double meshing being thereby prevented.

In the conventional example, there is a need to form individual oil chambers into which hydraulic pressures of the respective hydraulic coupling elements of the first and second groups are inputted individually, and when the total number of hydraulic coupling elements is increased to meet an increase in the number of shift ranges, the number of oil chambers is also increased. As a result of this, the length of the fail-safe valve is increased, and there is increased the possibility that a valve stick is caused. Moreover, the diameter of the valve element of the fail-safe valve is made thicker, and the mass of the valve element is increased, this deteriorating the response of the fail-safe valve when switched over from the open position to the closed position.

SUMMARY OF THE INVENTION

The present invention was made to solve the above problem and an object thereof is to provide a control device for a vehicle automatic transmission which can improve the toughness against the valve stick and response in switching over of a fail-safe valve by making it smaller in size.

With a view to solving the aforesaid problem, according to the present invention, there is provided a control device for a vehicle automatic transmission comprising two hydraulic coupling elements belonging to a first group and two or more hydraulic coupling elements belonging to a second group and adapted to selectively establish a plurality of shift ranges through a simultaneous engagement of the two hydraulic coupling elements of the first group and a simultaneous engagement of either one of the two hydraulic coupling elements of the first group and any one of the two or more hydraulic coupling elements of the second group, wherein shift control valves are provided which individually control the supplying and draining of oil to and from the respective hydraulic coupling elements of the first and second groups, and wherein a fail-safe valve is interposed between the shift control valves other than the shift control valves corresponding to the hydraulic coupling elements that are being intended to establish a predetermined single shift range and an oil supply passage communicating with a hydraulic pressure source, the fail-safe valve being able to freely be switched over between an open position where the oil supply passage is connected to the other shift control valves and a closed position where the connection is disconnected, wherein a resultant signal valve is provided that is adapted to output a signal pressure when hydraulic pressures of the two hydraulic coupling elements of the first group are inputted into the resultant signal valve to be found that the hydraulic pressures of the two hydraulic coupling elements increase, and further wherein the fail-safe valve is constructed so as to be switched over to the closed position when hydraulic pressures of the respective hydraulic coupling elements of the second group and the signal pressure are inputted into the fail-safe valve to be found that any two or more of the hydraulic pressures and signal pressure increase at the same time.

According to the invention, when oil is supplied to any one of the hydraulic coupling elements of the second group in a state in which the two hydraulic coupling elements of the first group are in engagement, that is, in a state in which a signal pressure is outputted from the resultant signal valve, the fail-safe valve is switched over to the closed position for effecting a fail safe. In addition, even if only one of the two hydraulic coupling elements of the first group is in engagement or the two hydraulic coupling elements are released, that is, no signal pressure is outputted, when oil is supplied to two or more of the hydraulic coupling elements of the second group, the fail-safe valve is switched over to the closed position for effecting a fail safe.

Moreover, there may be provided a single oil chamber for input of a signal pressure in the fail-safe valve instead of the two oil chambers into which the hydraulic pressures of the two hydraulic coupling element of the first group are inputted. This serves to shorten the valve length of the fail-safe valve and to thin the diameter of the valve element of the fail-safe valve to reduce the weight thereof.

BRIEF DESCRIPTION OF THE DRAWINGS

FIG. 3 is a table showing the relationship between engagement conditions of hydraulic coupling elements and excitation conditions of solenoid valves when respective speed ranges are established.

DETAILED DESCRIPTION OF THE PREFERRED EMBODIMENTS

Figure 1:
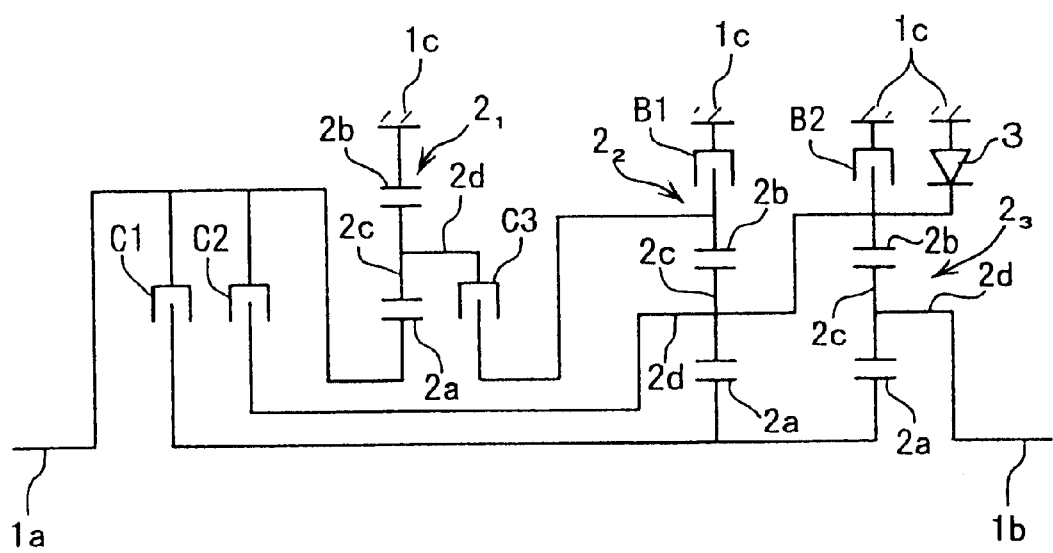
FIG. 1 is a schematic view showing an example of a transmission which a device according to the present invention is applied.

Referring to FIG. 1, reference numeral 1 denotes an automatic transmission for a vehicle, and the automatic transmission 1 comprises a planetary-gear type transmission for six forward ranges and a single reverse range in which first to third three planetary gears $2_1$, $2_2$, $2_3$ are disposed between an input shaft 1a for connecting a fluid torque converter to an engine (not shown) and an output shaft 1b connected to a driving wheel of the vehicle via a differential gear (not shown).

The planetary gears $2_1$, $2_2$, $2_3$ each comprises a sun gear 2a, a ring gear 2b, pinions 2c that are brought into mesh engagement with the sun and ring gears 2a, 2b and a carrier 2d for rotatably supporting the pinions. The sun gear 2a of the first planetary gear $2_1$ is coupled to the input shaft 1a, the carrier 2d of the third planetary gear $2_3$ is coupled to the output shaft 1b. In addition, the ring gear 2b of the first planetary gear $2_1$ is coupled to a casing 1c of the transmission 1 for preventing the rotation thereof. The sun gears 2a, 2a of the second and third planetary gears $2_2$, $2_3$ are coupled to each other, and the carrier 2d of the second planetary gear $2_2$ and the ring gear 2b of the third planetary gear $2_3$ are coupled to each other, this ring gear 2b being coupled to the casing 1c via a one-way clutch 3 as a reaction force receiver.

Provided in the transmission 1 as hydraulic coupling elements are a first clutch C1 for coupling the input shaft 1a to the sun gears 2a, 2a of the second and third planetary gears $2_2$, $2_3$, a second clutch C2 for coupling the input shaft 1a to the carrier 2d of the second planetary gear $2_2$, a third clutch C3 for coupling the carrier 2d of the first planetary gear $2_1$ to the ring gear 2b of the second planetary gear $2_2$, a first brake B1 for coupling the ring gear 2b of the second planetary gear $2_2$ to the casing 1c and a second brake B2 for coupling the ring gear 2b of the third planetary gear $2_3$ to the casing 1c.

According to the above construction, when the first clutch C1 and the second brake B2 are brought into engagement at the same time, a first speed gear is established. When the first clutch C1 and the first brake B1 are brought into engagement at the same time, a second speed range is established. When the first clutch C1 and the third clutch C3 are brought into engagement at the same time, a third speed range is established. When first clutch C1 and the second clutch C2 are brought into engagement at the same time, a fourth speed range is established. When the second clutch C2 and the third clutch C3 are brought into engagement at the same time, a fifth speed range is established. Further, when the second clutch C2 and the first brake B1 are brought into engagement at the same time, a sixth speed gear is established, and when the third clutch C3 is brought into engagement with the second brake B2, a reverse range is established.

Figure 2:
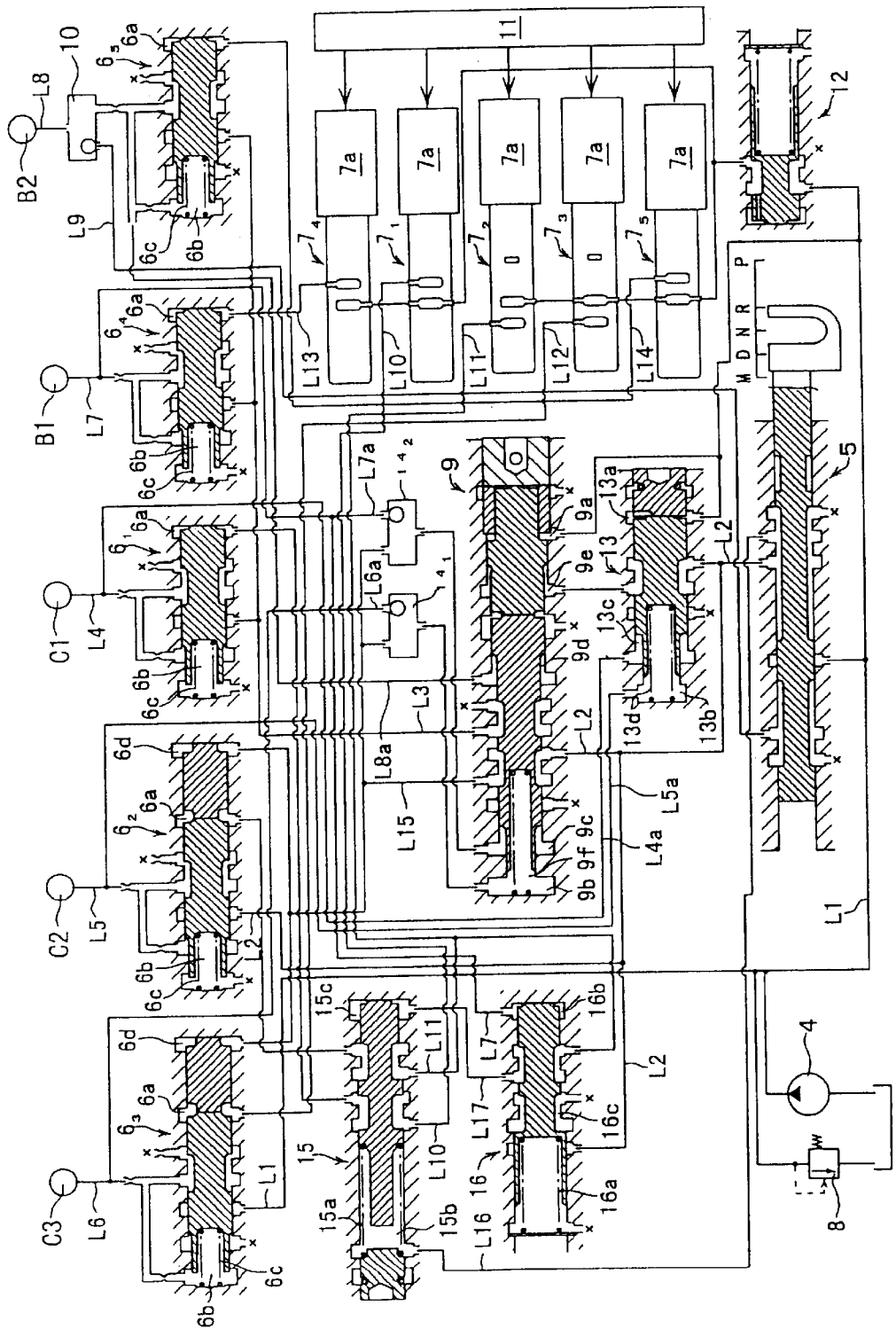
FIG. 2 is a view showing an example of a hydraulic circuit of the device according to the present invention.

These clutches C1, C2, C3 and brakes B1, B2 operate and are controlled through a hydraulic circuit shown in FIG. 2.

Provided in this hydraulic circuit are a hydraulic pressure source 4, a manual valve 5, first to fifth five shift control valves $6_1$ to $6_5$, and first to fifth five solenoid valves $7_1$ to $7_5$. The first to fifth five shift control valves $6_1$ to $6_5$ individually control the supply and drain of the oil to and from the clutches C1, C2, C3 and the brakes B1, B2. The first to fifth five solenoid valves $7_1$ to $7_5$ individually control the five shift control valves $6_1$ to $6_5$.

The manual valve 5 is constructed so as to be switched over in interlocking with operations of a shift selector lever (not shown) to five shift positions; a "P" position as a parking range, an "R" position as a reverse range, an "N" as a neutral range (a position shown in the figure), a "D" position as an automatic speed change range for forward travel, and an "M" position as a manual speed change range for forward travel. At the "D" and "M" positions, an oil passage L1 communicating with the oil pressure source 4 is connected to an oil passage L2, whereby a pressure oil regulated to a predetermined line pressure with a regulator 8 is supplied to the oil passage L2, and the pressure oil is then supplied to the second shift control valve $6_2$ for the second clutch C2 via the oil passage L2 at all times. In addition to this, the pressure oil is also supplied to the first shift control valve $6_1$ for the first clutch C1, the fourth shift control valve $6_4$ for the first brake B1 and the fifth shift control valve $6_5$ for the second brake B2, via an oil passage L3 connected to the oil passage L2 via a fail-safe valve 9 that will be described later. The shift control valve $6_3$ for the third clutch C3 is supplied with the pressure oil via the oil passage L1 at all times independently from the manual valve 5.

Moreover, oil passages L4, L5, L6 and L7 communicating respectively with the first to third clutches C1, C2, C3 and the first brake B1 are directly connected respectively to the first to fourth shift control valves, $6_1$, $6_2$, $6_3$, $6_4$. But, oil passage L8 communicating with the second brake B2 is constructed so as to selectively be connected to the fifth shift control valve $6_5$ and oil passage L9 communicating with the manual valve 5 via a shuttle valve 10. The oil passage L9 is connected to the oil passage L1 when the manual valve 5 is in the "R" position, and therefore, with the manual valve in that "R" position, the second brake B2 is engaged at all times, and when the third clutch C3 is supplied with the pressure oil from the third shift control valve $6_3$ and is then brought into engagement, the reverse range is established.

The respective shift control valves $6_1$, $6_2$, $6_3$, $6_4$, $6_5$ comprise an oil chamber 6a for pushing the respective shift control valves $6_1$, $6_2$, $6_3$, $6_4$, $6_5$ to a leftward oil supply position, an oil chamber 6b for pushing them to a rightward oil drain position (a position shown in the figure) and a spring 6c accommodated in the oil chamber 6b. Signal pressures from the respective solenoid valves $7_1$ to $7_5$ are inputted into the corresponding oil chambers 6a of the respective shift control. valves $6_1$ to $6_5$ via respective oil passages L10 to L14 communicating, respectively, with the respective solenoid valves $7_1$ to $7_5$. Further, hydraulic pressures on the downstream side of the respective shift control valves $6_1$ to $6_5$ are inputted into the oil chambers 6b of the respective shift control valves $6_1$ to $6_5$ and hydraulic pressures on the downstream side of the respective shift control valves $6_1$ to $6_5$ that is, the hydraulic pressures of the respective hydraulic coupling elements C1, C2, C3, B1, B2 are regulated in response to signal pressures from the respective solenoid valves $7_1$ to $7_5$.

The respective solenoid valves $7_1$ to $7_5$ comprises solenoid proportional valves adapted to output a signal pressure in accordance with a current value at which solenoids 7a of the solenoid valves $7_1$ to $7_5$ are excited. Then, the excitation of the solenoids $7a$ of the solenoid valves $7_1$ to $7_5$ are controlled by an electric control circuit 11 composed of a mounted computer. A modulator pressure (a certain pressure lower than the line pressure) from a modulator valve 12 connected to the oil passage L1 is inputted into the respective solenoid valves $7_1$ to $7_5$, and a signal pressure outputted in a fully opened state becomes a modulator pressure.

When the manual valve 5 is in the "D" and "M" positions, all the shift control valves $6_1$ to $6_5$ can be supplied with the pressure oil. When the signal pressures from the first and fifth solenoid valves $7_1$, $7_5$ are increased, the pressure oil is supplied to the first clutch C1 and the second brake B2 via the first and fifth shift control valves $6_1$, $6_5$, whereby the first speed range is established. When the signal pressures from the first and fourth solenoid valves $7_1$, $7_4$ are increased, the pressure oil is supplied to the first clutch C1 and the first brake B1 via the first and fourth shift control valve $6_1$, $6_4$, whereby the second speed range is established. When the signal pressures from the first and third solenoid valves $7_1$, $7_3$ are increased, the pressure oil is supplied to the first and third clutches C1, C3 via the first and third shift control valves $6_1$, $6_3$, whereby the third speed range is established. When the signal pressures of the first and second solenoid valves $7_1$, $7_2$ are increased, the pressure oil is supplied to the first and second clutches C1, C2 via the first and second shift control valves $6_1$, $6_2$, whereby the fourth speed range is established. When the signal pressures from the second and third solenoid valves $7_2$, $7_3$ are increased, the pressure oil is supplied to the second and third clutches C2, C3 via the second and third shift control valves $6_2$, $6_3$, whereby the fifth speed range is established. Further, when the signal pressures from the second and fourth solenoid valves $7_2$, $7_4$ are increased, the pressure oil is supplied to the second clutch C2 and the first brake B1 via the second and fourth shift control valves $6_2$, $6_4$, whereby the sixth speed range is established.

Then, the manual valve 5 is in the "D" position, the respective solenoid valves $7_1$ to $7_5$ are controlled by an electronic control circuit 11 in response to the running condition of the vehicle, whereby automatic shifts are carried out between the first speed and sixth speed. Further, when the manual valve 5 is in the "M" position, the respective solenoid valves $7_1$ to $7_5$ are controlled by the electronic control circuit 11 by operating upshift and downshift switches (not shown) and an upshift or downshift is performed every time the upshift switch or downshift switch is switched on. In addition, in shifting speed gears, an increase in pressure of the hydraulic coupling elements that are brought into engagement at the same time in shifting and a decrease in pressure of the hydraulic coupling elements that are released from the engaged states in shifting is suitably controlled with the solenoid valves adapted to operate so as to produce no shift shock.

Here, the first, fourth and fifth solenoid valves $7_1$, $7_4$, $7_5$ are constituted by normally-closed type solenoid valves, while the second and third solenoid valves $7_2$, $7_3$ by normally-opened solenoid valves. The relationship between exciting conditions of the solenoids $7a$ of the respective solenoid valves $7_1$ to $7_5$ and engagement conditions of the hydraulic coupling elements C1 to C3, B2, B3 when the respective speed ranges are established at the "D" and "M" positions is illustrated as shown in FIG. 3. In the figure, the sign ○ indicates that the hydraulic coupling elements are coupled, the sign X indicates that they are released.

As is clear from FIG. 3, in this mode for carrying out the invention, the first clutch C1 and the second clutch C2 constitutes the hydraulic coupling elements of the first group, and the third clutch C3, the first brake B1 and the second brake B2 constitute the hydraulic coupling elements of the second group. And, the first to sixth speed ranges are selectively established through a simultaneous engagement of the first and second clutches C1, C2 that are the hydraulic coupling elements of the first group and an simultaneous engagement of either of the first and second clutches C1, C2 and any of the third clutch C3, the first brake B1 and the second brake B2 that are the hydraulic coupling element of the second group.

Even if there occurs a case in which three or more hydraulic coupling elements are engaged at the same time, or two hydraulic coupling elements of the second group are engaged at the same time, specifically, when the third clutch C3 and the first brake B1 which belong to the second group are brought into engagement at the same time, there is caused a double meshing, whereby the transmission 1 is put into a locked state. Further, if the third clutch C3 and the second brake B2 which belong to the second group are brought into engagement at the same time during the forward travel, the reverse range is established, and this results in putting an excessive load on the transmission 1 or the engine.

To this end, in the mode for carrying out the invention, the common oil passage L3 is connected to the oil supply ports of the first, fourth and fifth shift valves $6_1$, $6_4$, $6_5$ other than the shift control valves $6_2$, $6_3$ corresponding to the second and third clutches C2, C3 which are being intended to establish a predetermined single speed range, for instance, the fifth speed range, and the fail-safe valve 9 is interposed between this oil passage L3 and the oil passage L2 which is an oil supply passage. Thus, the supply of pressure oil to the first, fourth and fifth shift control valves $6_1$, $6_4$, $6_5$ can be stopped at the time of a failure in which the pressure oil is simultaneously supplied to a plurality of hydraulic coupling elements that must not simultaneously be brought into engagement, whereby the aforesaid problem can be prevented.

The fail-safe valve 9 can freely be switched to a leftward open position where the oil passage L2 and oil passage L3 are connected to each other and a rightward closed position (the position shown in the figure) where the connection so established is disconnected. A line pressure from the oil passage L1 is inputted into an oil chamber $9a$ at the right end so as to push the fail-safe valve 9 to an open position side. In addition, four oil chambers $9b$, $9c$, $9d$, $9e$ are formed in the fail-safe valve 9 for pushing it toward a closed position side. The hydraulic pressure of the third clutch C3 is inputted into the oil chamber $9b$ from an oil passage L6a branching off from the oil passage L6. The hydraulic pressure of the first brake B1 is inputted into the oil chamber $9c$ from an oil passage L7a branching off from the oil passage line L7. The hydraulic pressure of the second brake B2 is inputted into the oil chamber $9d$ from the oil passage L8a ranching off from a connecting oil passage between the fifth shift control valve $6_5$ and the shuttle valve 10. In addition, a signal pressure outputted from a resultant signal pressure valve 13, which will be described later, is inputted into the oil chamber $9e$, and furthermore, the fail-safe 9 is biased with a spring $9f$ to the closed position side. Then, when the hydraulic pressures that are inputted into any two oil chambers of the oil chambers $9b$, $9c$, $9d$, $9e$ becomes equal to or larger than a predetermined value, a resultant force of a pushing force by these hydraulic pressures and the biasing force of the spring $9f$ exceeds a pushing force by the line pressure inputted into the oil chamber $9a$, whereby the fail-safe valve 9 is constructed so as to be switched over to the closed position.

The resultant signal valve 13 can freely be switched over between the rightward open position where the oil passage L2 is connected to the oil chamber 9e (the position shown in the figure) and the leftward closed position where the connection so established is disconnected. In addition, a line pressure from the oil passage L1 is inputted into a right end oil chamber 13a of the resultant signal valve 13, to thereby push the valve 13 to an open position side, and two oil chambers 13b, 13c are provided in the resultant signal valve 13 for pushing it to a closed position side. The hydraulic pressure of the second clutch C2 is inputted into the oil chamber 13b via an oil passage L5a branching off from the oil passage L5 and the hydraulic pressure of the first clutch C1 is inputted into the oil chamber 13c via an oil passage L4a branching off from the oil passage L4, and further, the resultant signal valve 13 is biased toward the closed position side with a spring 13d. Thus, when there is produced a state in which the first and second clutches C1, C2 are both brought into engagement (fourth speed range), a resultant force of the pushing force by the hydraulic pressures inputted into the oil chambers 13b, 13c and the biasing force of the spring 13d exceeds the pushing force resulting from the line pressure inputted into the oil chamber 13a, whereby the resultant signal valve 13 is constructed so as to be switched over to the open position.

Thus, when the first and second clutches C1, C2 which are the hydraulic coupling elements of the first group are both brought into engagement, the line pressure from the oil passage L1 which is the output signal pressure of the resultant signal valve 13 is inputted into the oil chamber 9e of the fail-safe vale 9. In this state, if the pressure oil is supplied to any of the third clutch C3, the first brake B1 and the second brake B2 which are hydraulic coupling elements of the second group, the fail-safe valve 9 is switched over to the closed position. In addition, even in a state in which only one of both the first and second clutches C1, C2 is brought into engagement, or the clutches C1, C2 are both released and no line pressure is inputted into the oil chamber 9e, when the pressure oil is supplied to two or more of the third clutch C3, the first brake B1 and the second brake B2, the fail-safe valve 9 is switched over to the closed position. Then, when the fail-safe valve 9 is switched over to the closed position, the connection between the oil passage L2 and the oil passage L3 is disconnected. Thus, at the time of failure, the supply of pressure oil to the first, fourth and fifth shift control valves $6_1$, $6_4$, $6_5$ is stopped, and the hydraulic coupling elements C1, B1, B2 corresponding to those shift control valves are released.

On the other hand, the following construction can be considered. That is, the resultant signal valve 13 is omitted, and five oil chambers are provided in the fail-safe valve 9 for pushing it to the closed position side. The hydraulic pressures of the first clutch C1, the second clutch C2, the third clutch C3, the first brake B1 and the second brake B2 are inputted into the five oil chambers. When the hydraulic pressures inputted into three or more oil chambers of those five oil chambers increase, in other words, three or more hydraulic coupling elements are brought into engagement at the same time, the fail-safe valve 9 is constructed so as to be switched over to the closed position. With this construction, however, the valve length of the fail-safe valve 9 becomes long, and there is increased the possibility that a valve stick is caused. In addition, lands are formed on the fail-safe valve on the side facing the oil chambers, and due to this, the diameter of the valve element becomes thicker sequentially as it extends toward the end on the closed position side, and as with the aforesaid case, when the five oil chambers are provided, the diameter of the valve element at the end thereof becomes quite thick, this increasing the mass of the valve element, whereby the response of the valve element when the fail-safe valve 9 is switched over from the open position to the closed position is deteriorated. To cope with this, with the present embodiment, there are needed only four oil chambers 9b, 9c, 9d, 9e that are provided in the fail-safe valve 9 for pushing it to the closed position side, and therefore, not only can the valve length of the fail-safe valve 9 be made shorter but also the diameter of the fail-safe valve 9 can be made thin, whereby the weight of the fail-safe valve 9 can be reduced, thereby making it possible to improve the toughness against the valve stick and response at the time of valve position switching of the fail-safe valve 9.

Furthermore, in this mode for carrying out the invention, an oil passage L15 is provided which is connected to the oil passage 2 via the fail-safe valve 9 when the fail-safe valve 9 is located at the closed position. Further, the oil passage L6a and the oil passage L15 are connected to the oil chamber 9b of the fail-safe valve 9 via a shuttle valve $14_1$, and the oil passage L7a and the oil passage L15 are connected to the oil chamber 9c of the fail-safe valve 9 via a shuttle valve $14_2$. Thus, once the fail-safe valve 9 is switched over to the closed position at the time of failure, the line pressure from the oil passage L2 is inputted into the oil chambers 9b, 9c via the oil passage L15. And, even if the hydraulic pressures of the hydraulic coupling elements C1, B1, B2 are reduced when the supply of pressure oil to the first, fourth and fifth shift control valves $6_1$, $6_4$, $6_5$ is stopped, the fail-safe valve 9 can be held at the closed position, the chattering of the failsafe valve 9 being thus prevented.

Even if the fail-safe valve 9 is switched over to the closed position at the time of failure, since the oil passage L2 and oil passage L1 which both function as an oil supply passage are connected to the second shift control valve $6_2$ and the third shift control valve $6_3$, respectively, the fifth speed range can be established by allowing the second clutch C2 and the third clutch C3 to be brought into engagement. However, when the second solenoid valve $7_2$ and third solenoid valve $7_3$ fail and cannot be controlled, whereby the second shift control valve $6_2$ and the third shift control valve $6_3$ cannot be switched over to the oil supply position side, in other words, when high signal pressures cannot be outputted from the solenoid valves $7_2$, $7_3$ due to the on-failure thereof (a failure in which the solenoids are kept excited), the pressure oil cannot be supplied to the second and third clutches C2, C3, and thus, the fifth speed range cannot be established.

To cope with this, in this embodiment, second oil chambers 6d are formed in the second and third shift control valves $6_2$, $6_3$, respectively, for pushing them to the oil supply position side. The oil passage L15 is then connected to the second oil chambers 6d, and when the fail-safe valve 9 is situated at the closed position, the line pressure from the oil passage L2 which is the oil supply line is inputted into the oil chambers 6d via the oil passage L15, whereby the respective shift control valves $6_2$, $6_3$ are constructed so as to be switched to and held at the oil supply position in a forcible fashion. Thus, when the fail-safe valve 9 is switched over to the closed position at the time of failure, the pressure oil is forcibly supplied to the second and third shift control valves $6_2$, $6_3$, whereby the fifth speed range can be established. On the other hand, it may be constructed such that the oil passage into which the signal pressures of the solenoid valves are inputted and the oil passage L15 are connected to the oil chambers 6a of the second and third shift control valves $6_2$, $6_3$ via the shuttle valves, whereby the line pressure from the oil passage L2 at the failure time is inputted into the oil chamber 6a via the oil passage L15 and the shuttle valves, so that the respective shift control valves $6_2$, $6_3$ can be switched to and held at the oil supply position.

In addition, the excitation of all the solenoid valves $7_1$ to $7_5$ is stopped when the system goes down due to disconnection or the like, only the signal pressures of the second and third solenoid valves $7_2$, $7_3$ which are of the normally-opened type increase, the pressure oil is supplied to the second and third clutches C2, C3 via the second and third shift control valves $6_2$, $6_3$, whereby the fifth speed range is established. However, only with the fifth speed range available, the start and low-speed running becomes difficult. Consequently, it is desired that, when the system is down, the fifth speed range is established with the "D" position, while with the "M" position, a speed range lower than the fifth speed range, for example, the third speed range is established, that is, the fifth speed range and third speed range can be attained by switching operation between the "D" and "M" ranges. To this end, instead of the second clutch C2, the first clutch C1 needs to be engaged at the "M" position.

Then, in this embodiment for carrying out the invention, a switching valve 15 is provided for selectively switching the oil passage L11 communicating with the second solenoid valve $7_2$ between the oil chamber 6a of the second shift control valve $6_2$ and the oil chamber 6a of the first shift control $6_1$. Accordingly, when the system goes down, at the "D" position, the oil passage L11 is connected to the second shift control valve $6_2$, and the second shift control valve $6_2$ is switched to the oil supply position with a high signal pressure from the second solenoid valve $7_2$ to thereby allow the second clutch C2 to be engaged, while at the "M" position, the oil passage 11 is connected to the oil chamber 6a of the first shift control valve $6_1$ whereby the first shift control valve $6_1$ is switched to the oil supply position to thereby allow the first clutch C1 to be engaged.

The switching valve 15 is adapted to freely be switched to a first switching position (a position shown in the figure) where the oil passage L10 communicating with the first solenoid valve $7_1$ and the oil passage L11 communicating with the second solenoid valve $7_2$ are connected, respectively, to the oil chamber 6a of the first shift control valve $6_1$ and the oil chamber 6a of the second shift control valve $6_2$, and a second switching position where those connections are disconnected to thereby connect the oil passage L11 to the oil chamber 6a of the first shift control valve $6_1$, and the switching valve 15 is biased with a spring 15a to the first switching position. In addition, provided in the switching valve 15 are an oil chamber 15b at a left end for pushing the switching valve 15 to the first switching position side and an oil chamber 15c at a right end for pushing the same valve to the second switching position side. Then, an oil passage L16, which is connected to the oil passage L1 when the manual valve 5 is in the "D" position and is made to open to the atmosphere when the valve 5 is in the "M" position, is connected to the oil chamber 15b, and the signal pressure from the second solenoid valve $7_2$ is inputted into the oil chamber 15c via an oil passage 17 branching off from the oil passage L11. Thus, at the "D" position, the line pressure from the oil passage L1 is inputted into the oil chamber 15b, and even when the signal pressure from the second solenoid valve $7_2$ becomes a highest pressure (modulator pressure) due to the system going down, the switching valve 15 is held at the first switching position. But, at the "M" position, since the oil chamber 15b is made to open to the atmosphere via the oil passage L16, when the signal pressure from the second solenoid valve $7_2$ becomes a highest pressure due to the system going down, the switching valve 15 is switched to the second position, and as described above, the first shift control valve $6_1$ is switched over to the oil supply position to thereby allow the first clutch C1 to be engaged, the third speed range being thereby established.

When the system goes down while the vehicle is running at high speeds with a speed range faster than the fourth speed range in the "M" position, resulting in a downshift to the third speed range, there is a probability of excessive revolutions of the engine. To cope with this, in this embodiment for carrying out the invention, a closing valve 16 is disposed along the oil passage L17 which is able to be switched between a rightward open position where the oil passage L17 is opened (a position shown in the figure) and a leftward closed position where the oil passage L17 is closed. Then, the closing valve 16 is pushed to an open position side with a spring 16a, and an oil passage L7 communicating with the first brake B1 that is engaged when a speed range lower than the third speed range, such as the second speed range is established is connected to an oil chamber 16b at a right end of the closing valve 16, whereby the closing valve 16 is constructed so as to be switched to the closed position against the spring 16a by virtue of the hydraulic pressure of the first brake B1 when the second speed range is established. In addition, formed in the closing valve 16 is an annular groove 16c communicating with the oil passage L2 when it is located at the closed position, and the diameter of a land on the left-hand side of this annular groove 16c is made larger than that of a land on the right-hand side thereof, whereby once the closing valve 16 is switched to the closed position, a leftward pushing force resulting from the difference in land diameter between the left and right lands is applied thereto, thus the closing valve 16 being held at the closed position irrespective of the hydraulic pressure of the first brake B1.

According to the above construction, the closing valve 16 is switched to the closed position when the second speed range is established after the vehicle starts with the "D" or "M" position engaged, and thereafter, as long as the "D" or "M" position is kept engaged, the closing valve 16 is held at the closed position, whereby the signal pressure from the second solenoid valve $7_2$ is not inputted into the oil chamber 15c of the switching valve 15. Thus, even if the system goes down at the "M" position, the switching valve 15 is not switched to the second switching position, and at the time of system down, the fifth speed range can be established, whereby there is no risk of downshift to the third speed gear even when the system goes down while the vehicle is running at high speeds. In addition, even if the closing valve 16 is switched to and held at the closed position, when the shift selector lever is put into the "N" position, since the oil passage L2 is made to open to the atmosphere, the closing valve 16 is restored to the open position by virtue of the biasing force of the spring 16a. Thus, when the system goes down, if the shift selector lever is put in the "M" position after being once put in the "N" position, the switching valve 15 is switched to the second switching position, and thus the third speed range is established as described above, and moreover, by range switching operations between the "D" and "M" positions, the vehicle can be shifted to the fifth and third speed ranges.

Furthermore, in this mode for carrying out the invention, the respective shift control valves $6_1$ to $6_5$ are constructed so as to be controlled by the electronic control circuit 11 via the respective solenoid valves $7_1$ to $7_5$, but the respective shift control valves $6_1$ to $6_5$ may be constituted by solenoid valves, whereby the respective shift control valves $6_1$ to $6_5$ may be constructed so as to directly be controlled by the electronic control circuit 11.

While only certain embodiments of the invention have been specifically described herein, it will apparent that numerous modifications may be made thereto without departing from the spirit and scope of the invention.

As is clear from the description made heretofore, according to the present invention, not only can the valve length of the fail-safe valve be made shorter but also the diameter of the valve element can be made thinner to thereby reduce the weight thereof, there by making it possible to improve the toughness against the valve stick and response in switching of the fail-safe valve.

What is claimed is:

1. A control device for a vehicle automatic transmission having two hydraulic coupling elements belonging to a first group and two or more hydraulic coupling elements belonging to a second group and selectively establishing a plurality of shift ranges through a simultaneous engagement of said two hydraulic coupling elements of said first group and a simultaneous engagement of either one of said two hydraulic coupling elements of said first group and any one of said two or more hydraulic coupling elements of said second group, said control device comprising:

shift control valves individually controlling the supply and drain of oil to and from said respective hydraulic coupling elements of said first and second groups;

a fail-safe valve interposed between said shift control valves other than said shift control valves corresponding to said hydraulic coupling elements that are being intended to establish a predetermined gear change speed and an oil supply passage communicating with a hydraulic pressure source, said fail-safe valve being switchable between an open position where said oil supply passage is connected to said other shift control valves and a closed position where said connection is disconnected; and a resultant signal valve into which hydraulic pressures of said two hydraulic coupling elements of said first group are inputted, and outputting a signal pressure when the hydraulic pressures of said two hydraulic coupling elements of said first group are increased at the same time, wherein hydraulic pressures of said respective hydraulic coupling elements of said second group and said signal pressure are inputted into said fail-safe valve, and said fail-safe valve is switched over to said closed position when any two or more of said hydraulic pressures and signal pressure are increased at the same time.

2. A control device for a vehicle automatic transmission according to claim 1, wherein, when said fail-safe valve is in said closed position, said oil supply passage is connected to a first oil passage communicating with said shift control valves of said hydraulic coupling elements that are being intended to establish the predetermined gear change speed.

3. A control device for a vehicle automatic transmission according to claim 2, further comprising:

at least one of shuttle valves interposed between said fail-safe valve and said hydraulic coupling elements of said second group, wherein said shuttle valves further communicates with said first oil passage connecting said fail-safe valve and said shift control valves of said hydraulic coupling elements that are being intended to establish the predetermined gear change speed.

4. A control device for a vehicle automatic transmission according to claim 1, further comprising:

solenoid valves individually controlling said shift control valves; and a switching valve interposed between a normally-opened type solenoid valve and said shift control valve corresponding to said solenoid valve, said switching valve being switchable between a first switching position communicating said normally-opened type solenoid valve with said shift control valve corresponding said solenoid valve and a second switching position communicating said normally-opened type solenoid valve with said shift control valve other than said shift control valve corresponding to said solenoid valve.

5. A control device for a vehicle automatic transmission according to claim 4, wherein said switching valve is switched to said second switching position by switching a manual valve so as to introduce air pressure into said switching valve, when the excitation of said solenoid valves is stopped.

6. A control device for a vehicle automatic transmission according to claim 4, further comprising:

a closing valve interposed between said switching valve and a second oil passage branched off a third oil passage communicating said switching valve with said normally-opened type solenoid valve, said closing valve being switchable between an open position connecting said second oil passage to said switching valve, and a closed position which the connection is disconnected by inputting the hydraulic pressure from one of said hydraulic coupling elements, wherein, after said closing valve is switched to the closed position, said closing valve inputs a line pressure so as to maintain said closed position irrespective of the hydraulic pressure of said one of said hydraulic coupling elements.

* * * * *